July 12, 1932. G. E. DICKSON 1,867,354
WEATHERPROOF NAIL
Filed March 27, 1931
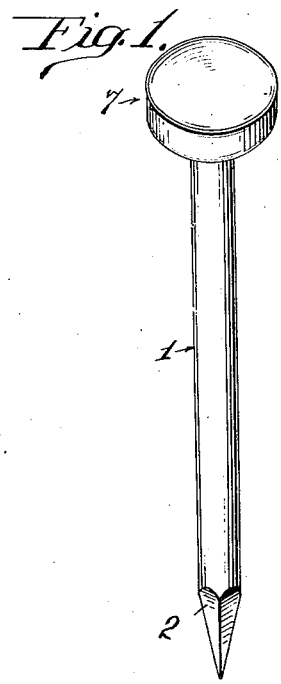
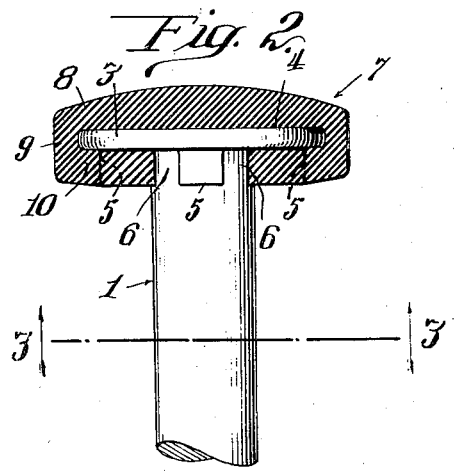
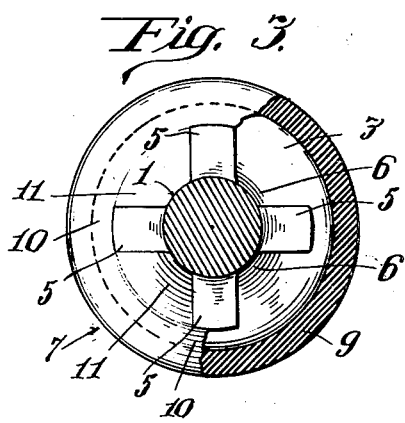
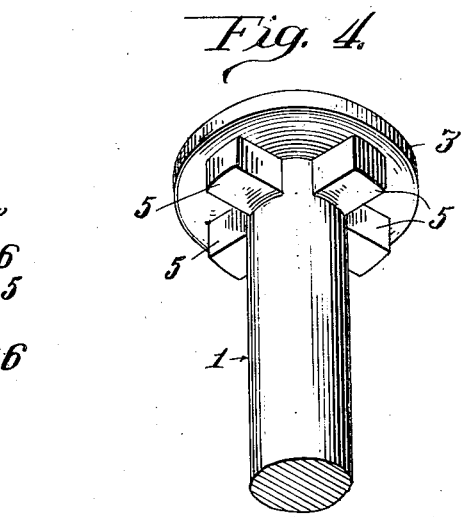
Inventor
George E. Dickson
By Arthur Wm. Nelson
Attorney Patented July 12, 1932

1,867,354

UNITED STATES PATENT OFFICE

GEORGE E. DICKSON, OF EVANSTON, ILLINOIS

WEATHERPROOF NAIL

Application filed March 27, 1931. Serial No. 525,756.

This invention relates to improvements in weather-proof nails and it consists of the matters hereinafter described and more particularly pointed out in the appended claims.

The primary object of the invention is to provide a nail of this kind, the soft metal cap of which is applied to the nail head by what is known as the "cold" method wherein a mass of cap material is applied to the head under pressure between coacting dies, the nail employed having a number of projections or lugs on its underside and connected to the shank, which permits the placement of the maximum of cap material on the underside and which at the same time prevents the turning of the cap upon the head.

A further object of the invention is to provide a nail of this kind which is practical to make in large numbers at a low cost and wherein but a minimum amount of cap material is employed for each nail and is distributed to the best advantage upon and about the nail head.

These objects of the invention as well as others, together with the many advantages thereof will more fully appear as I proceed with my specification.

In the drawing:—

Fig. 1 is a perspective view of a weatherproof nail embodying my invention.

Fig. 2 is a vertical sectional view on an enlarged scale through the capped end of the nail.

Fig. 3 is a horizontal sectional view through the nail as taken on the line 3—3 of Fig. 2, with parts shown as broken away to more fully disclose the structure thereof.

Fig. 4 is a perspective view of the preferred form of the top end of the nail used, and before the cap has been applied to make it weatherproof.

Referring now in detail to that embodiment of the invention illustrated in the accompanying drawing and especially to Fig. 4, the wire nail therein shown includes a cylindrical shank 1 having a piercing or driving point 2 at one end and a head 3 at the other end. The head of the nail is of a diameter considerably greater than that of the shank and is flat on its top surface as at 4. On the bottom surface of said head is a plurality of arcuately spaced projections or lugs 5 which are integral with both the shank and head. Preferably these projections or lugs are radially extending ones, of a length less than that of the diameter of the head so that they terminate short of the peripheral edge thereof and provide angular or square cornered pockets 6 between them, as best shown in Fig. 3.

7 indicates as a whole, the cap of the weatherproof nail and which cap is made of a relatively soft metal such as lead. Said cap which encloses the head 4 of the nail completely, fills in the corners 6 before mentioned and is disposed in snug engagement with the sides and ends of the projections or lugs 5, and leaves only the bottom surface of the said projections or lugs exposed.

The cap includes a top wall 8 with a crowned top surface, a peripheral portion 9 of suitable thickness and a bottom part 10 having corner portions 11 that key in and fill up the pockets 6 of the head. The bottom surface of the cap including the projections or lugs 5 is preferably flat. With this construction, a maximum of cap metal is disposed upon the under side of the head of the nail, where it is needed in use.

When the nail has been driven home, the top of the head will be somewhat flattened due to the hammer blows it receives and when such a nail is used in connection with galvanized roofing or the like, the bottom portion 10 of the cap is brought into a good snug engagement with said roofing so that no moisture can seep through beneath the head.

By reason of the parts 11 of the cap being engaged or keyed in the corners 6 between the projections or lugs 5, the cap cannot turn with respect to the nail head so as to become loose thereon. Again, with a cap structure such as described, it is impossible for the points of the nails shipped in the same keg, from so engaging the underside of the caps of other nails as to pry them in a manner to loosen the same.

While in describing the invention, I have referred in detail to the form, arrangement and construction of the parts thereof, the same is to be considered as by way of illustration only, so that I do not wish to be limited thereto except as may be specifically set forth in the appended claims.

I claim as my invention:—

1. A weatherproof nail or the like embodying therein a shank and a head with a plurality of spaced lugs on the underside of the head and a cap member of relatively soft metal enclosing and in direct engagement with said head and with the sides and end of each lug and having parts disposed between said lugs, the cap terminating substantially flush with the bottom surface of said lugs.

2. A weatherproof nail or the like embodying therein a shank and a head with a plurality of radially extending lugs integral with the underside of the head and the adjacent parts of the shank and terminating short of the periphery of the head and forming keying pockets therebetween and a cap member of relatively soft metal enclosing and in direct engagement with said head and with the sides and end of said lugs with portions engaged in said pockets, said cap terminating substantially flush with the bottom surface of the said lugs.

3. A weatherproof nail or the like embodying therein a shank and a head with a plurality of flat bottomed, spaced lugs on the underside and terminating short of the peripheral edge of said head and a cap member of relatively soft metal enclosing and in direct engagement with said head and with the sides and end only of said lugs and which cap member has portions disposed between said lugs with their bottom surfaces substantially flush with those of said lugs.

In testimony whereof, I have hereunto set my hand, this 23d day of March, 1931.

GEORGE E. DICKSON.